(12) United States Patent
Fay

(10) Patent No.: US 12,714,012 B2
(45) Date of Patent: Aug. 25, 2026

(54) SYSTEM AND METHOD FOR CONTROLLING HARVESTING IMPLEMENT FLOATATION FORCE ON AN AGRICULTURAL HARVESTER

(71) Applicant: CNH Industrial America LLC, New Holland, PA (US)

(72) Inventor: Jeffrey B. Fay, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 842 days.

(21) Appl. No.: 17/883,863

(22) Filed: Aug. 9, 2022

(65) Prior Publication Data

US 2024/0049626 A1 Feb. 15, 2024

(51) Int. Cl.
*A01D 34/00* (2006.01)

(52) U.S. Cl.
CPC .................................. *A01D 34/008* (2013.01)

(58) Field of Classification Search
CPC ............................ A01D 34/008; A01D 41/141
See application file for complete search history.

(56) References Cited

U.S. PATENT DOCUMENTS 5,633,452 A 5/1997 Bebernes
7,552,577 B2 6/2009 Strosser
9,668,412 B2 6/2017 Ritter et al.
10,624,263 B2 4/2020 Dunn et al.
10,959,374 B2 3/2021 Duerksen et al.
2019/0327893 A1 10/2019 Hamilton et al.
2020/0337233 A1* 10/2020 Groves .................. A01D 34/04
2022/0053693 A1 2/2022 Gahres et al.
2022/0087101 A1 3/2022 Hunt et al.

FOREIGN PATENT DOCUMENTS

GB 2495497 A * 4/2013 ............. A01B 63/11
WO 2022/046769 A1 3/2022

OTHER PUBLICATIONS

Extended European Search Report for EP Application No. 23190675.1 dated Dec. 22, 2023 (eight pages).

* cited by examiner

*Primary Examiner* — Alan D Hutchinson
(74) *Attorney, Agent, or Firm* — Dority & Manning, P.A.

(57) ABSTRACT

An agricultural harvester includes a frame and a harvesting implement adjustably coupled to the frame. Furthermore, the agricultural harvester includes an arm coupled to the harvesting implement at a first pivot joint and coupled to the frame at a second pivot joint. Additionally, the agricultural harvester includes an actuator coupled between the frame and the harvesting implement, with the actuator configured to adjust a flotation force acting on the harvesting implement. Moreover, the agricultural harvester includes a sensor configured to generate data indicative of a pushing force acting on the harvesting implement and a computing system communicatively coupled to the sensor. In this respect, the computing system is configured to determine the pushing force acting on the harvesting implement based on the data generated by the sensor. In addition, the computing system is configured to control the operation of the actuator based on the determined pushing force.

17 Claims, 5 Drawing Sheets

SYSTEM AND METHOD FOR CONTROLLING HARVESTING IMPLEMENT FLOATATION FORCE ON AN AGRICULTURAL HARVESTER

FIELD OF THE INVENTION

The present disclosure generally relates to agricultural harvesters and, more particularly, to systems and methods for controlling harvesting implement floatation force on an agricultural harvester.

BACKGROUND OF THE INVENTION

There are several types of agricultural harvesters used to harvest crops growing within a field. For example, one type of agricultural harvester is a windrower or swather. Specifically, a windrower is used to cut crop material and form it into windrows that are later processed by other equipment, typically after windrows have dried. In this respect, the windrower includes a harvesting implement (e.g., a header) that is adjustably coupled to the frame or chassis of the windrower.

During a harvesting operation, the harvesting implement slides or otherwise rides along the surface of the field to closely follow the contours of the field surface. To facilitate such sliding, one or more actuators of the windrower exert a floatation force on the harvesting implement. This floatation force, in turn, supports a portion of the weight of the harvesting implement, with the remaining weight being supported by the field surface. Floatation force is an important parameter in maintaining the quality of the harvesting operation. In this respect, systems to control the floatation force being exerted on a harvesting implement have been developed. While such systems work well, further improvements are needed.

Accordingly, an improved system and method for controlling harvesting implement floatation force on an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester including a frame and a harvesting implement adjustably coupled to the frame, with the harvesting implement configured to harvest crop material present within a field across which the agricultural harvester is traveling. Furthermore, the agricultural harvester includes an arm coupled to the harvesting implement at a first pivot joint and coupled to the frame at a second pivot joint. Additionally, the agricultural harvester includes an actuator coupled between the frame and the harvesting implement, with the actuator configured to adjust a flotation force acting on the harvesting implement. Moreover, the agricultural harvester includes a sensor configured to generate data indicative of a pushing force acting on the harvesting implement and a computing system communicatively coupled to the sensor. In this respect, the computing system is configured to determine the pushing force acting on the harvesting implement based on the data generated by the sensor. In addition, the computing system is configured to control an operation of the actuator based on the determined pushing force.

In another aspect, the present subject matter is directed to a system for controlling harvesting implement floatation force on an agricultural harvester. The system includes a harvesting implement configured to harvest crop material present within a field across which the agricultural harvester is traveling. Furthermore, the system includes an actuator configured to adjust a flotation force acting on the harvesting implement. Additionally, the system includes a sensor configured to generate data indicative of a pushing force acting on the harvesting implement and a computing system communicatively coupled to the sensor. As such, the computing system is configured to determine the pushing force acting on the harvesting implement based on the data generated by the sensor. Moreover, the computing system is configured to control an operation of the actuator based on the determined pushing force.

In a further aspect, the present subject matter is directed to a method for controlling harvesting implement floatation force on an agricultural harvester. The agricultural harvester, in turn, includes a harvesting implement configured to harvest crop material present within a field across which the agricultural harvester is traveling. The method includes receiving, with a computing system, sensor data indicative of a pushing force acting on the harvesting implement as the agricultural harvester travels across the field. In addition, the method includes determining, with the computing system, the pushing force acting on the harvesting implement based on the received sensor data. Furthermore, the method includes controlling, with the computing system, an operation of an actuator configured to adjust a flotation force acting on the harvesting implement based on the determined pushing force.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
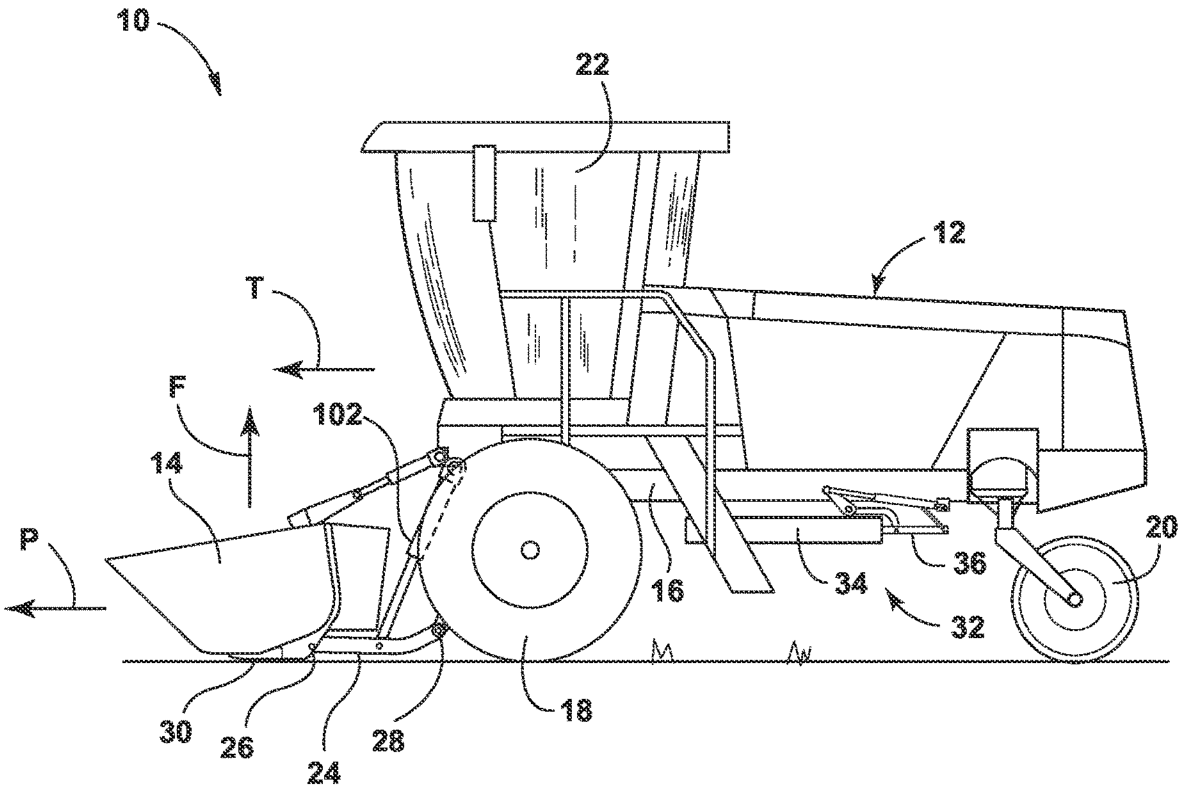
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for controlling harvesting implement floatation force on an agricultural harvester. As will be described below, the agricultural harvester includes a harvesting implement (e.g., a header) and one or more actuators (e.g., a hydraulic cylinder(s)) configured to exert a flotation force on the harvesting implement. As the agricultural harvester travels across a field to perform a harvesting operation thereon, the harvesting implement is configured to slide along the surface to the field to harvest crop material. In this respect, the floatation force supports a portion of the weight of the harvesting implement relative to the field surface. Thus, a pushing force must be exerted on the harvesting implement to overcome the resistance of the remaining weight of the harvesting implement being supported by the field surface, thereby allowing the harvesting implement to slide relative to the field surface.

A computing system of the disclosed system is configured to control the flotation force acting on the harvesting implement based on the pushing force acting on the harvesting implement. Specifically, in several embodiments, the computing system receives sensor data indicative of the pushing force acting on the harvesting implement from one or more sensor(s). The sensor(s) may, in turn, be in operative association with an arm pivotably coupled between the harvesting implement and the frame of the agricultural harvester or pivot joints associated with such arm. Additionally, the computing system determines the pushing force based on the received sensor data. Moreover, in some embodiments, the computing system may compare the determined pushing force to a predetermined range. In such embodiments, when the determined pushing force falls outside of the predetermined range, the computing system may control the operation of the actuator(s) to adjust the floatation force acting on the harvesting implement. For example, when the determined pushing force falls below a minimum value of the predetermined range, the computing system may control the operation of the actuator(s) to decrease the floatation force acting on the harvesting implement. Conversely, when the determined pushing force exceeds a maximum value of the predetermined range, the computing system may control the operation of the actuator(s) to increase the floatation force acting on the harvesting implement.

Controlling the flotation force acting on a harvesting implement based the pushing force acting on the harvesting implement improves the operation of the agricultural harvester. More specifically, to maintain the quality of the harvesting operation, the pushing force exerted on the harvesting implement should generally be constant. Conventional systems generally maintain the floatation force within a predetermined range of floatation forces such that the desired pushing force is exerted on the harvesting implement. However, such systems are unable to account for changes in soil type and/or conditions when controlling floatation force. For example, pushing force decreases in wet soil and increases in dry soil. Moreover, pushing force may decrease in soils with high clay content and increase in soils with high sand content. In this respect, by determining the pushing force acting on the harvesting implement during the harvesting operation, the disclosed system and method allows for the floatation force to be varied as soil conditions change throughout the field. Thus, the disclosed system and method maintain the quality of the harvesting operation as soil conditions change.

Referring now to drawings, FIG. 1 illustrates a side view of one embodiment of an agricultural harvester 10 in accordance with aspects of the present subject matter. In the illustrated embodiment, the agricultural harvester 10 is configured as a self-propelled windrower. In such an embodiment, the agricultural harvester 10 includes a tractor 12 that supports a harvesting implement 14 (e.g., a header). In this respect, as the agricultural harvester 10 travels across a field in a travel direction (e.g., as indicated by arrow T), the harvesting implement 14 is configured to slide along the field surface to harvest crop material. However, in alternative embodiments, the agricultural harvester 10 may be configured as any other suitable type of harvester having a harvesting implement configured to slide along the field surface during harvesting operations.

As shown, the tractor 12 may include a chassis or frame 16 configured to support and/or couple to various components of the agricultural harvester 10. For example, the frame 16 may be coupled to a set of transversely spaced-apart drive wheels 18 for propelling the agricultural harvester 10 across the field in the travel direction T. Furthermore, the frame 16 may be coupled to one or more rear wheels 20. In the illustrated embodiment, the rear wheels 20 are in the form of castors to facilitate turning of the agricultural harvester 10. Additionally, an operator cab 22 may be supported by the frame 16 that houses one or more control devices for controlling the operation of the agricultural harvester 10.

Moreover, the harvesting implement 14 is supported on the frame 16. More specifically, the agricultural harvester 10 includes one or more arms 24 coupling the harvesting implement 14 to the frame 16. For example, each arm 24 is coupled to the harvesting implement 14 at a first pivot joint 26 and coupled to the frame 16 at a second pivot joint 28. In addition, the arm(s) 24 is generally rigid. As mentioned above, the harvesting implement 14 is configured to slide along the field surface during harvesting operations. In this respect, the arm(s) 24 is configured to apply a pushing force (e.g., as indicated by arrow P) to the harvesting implement 14 as the agricultural harvester 10 moves in the travel direction T. Thus, in several embodiments, a skid shoe 30 positioned on the bottom of the harvesting implement 14 slides or otherwise rides along the field surface during harvesting operations. The first and second pivot joints 26, 28 allows the harvesting implement 14 to follow the contours off the field surface independently of the tractor 12 such that contact between the skid shoe 30 and the field surface is maintained. As the harvesting implement 14 slides along the field surface, a cutter (e.g., a sickle-bar, a rotary cutter, etc.) of the harvesting implement 14 cuts the crop material in the path of the harvesting implement 14.

As used herein, the pushing force P is the force applied to the harvesting implement 14 that overcomes the friction between the harvesting implement 14 and the field surface. That is, the pushing force P is the force that allows the harvesting implement 14 to slide relative to the field surface in the travel direction T. In this respect, the pushing force P acts on the harvesting implement 14 generally parallel to the travel direction T and the field surface.

In addition, the agricultural harvester 10 includes one or more actuators 102 coupled between the frame 16 and the harvester implement 14. In general, the actuator(s) 102 is configured to apply and/or adjust a flotation force (e.g., as indicated by arrow F) acting on the harvesting implement 14. As used herein, the floatation force F is a force that supports a portion of the weight of the harvesting implement 14 relative to the field surface. Thus, when the floatation force F is increased, a smaller portion of the weight of the harvesting implement 14 is supported by the field surface. Conversely, when the floatation force F is decreased, a larger portion of the weight of the harvesting implement 14 is supported by the field surface. In this respect, the floatation force F acts on the harvesting implement 14 generally perpendicular to the travel direction T and the field surface. As such, the actuator(s) 102 may correspond to any suitable device(s) configured to apply a floatation or lifting force on the harvesting implement 14, such a hydraulic cylinder(s), a pneumatic cylinder(s), an electric linear actuator(s), and/or the like.

Furthermore, the agricultural harvester 10 may also include a merger assembly 32 supported under the frame 16 at a location aft of the harvesting implement 14. In general, the merger assembly 32 may have any suitable configuration that allows it to function as described herein. For instance, as shown in FIG. 1, the merger assembly 32 may include a frame 34 configured to support an endless loop-style conveyor (not shown). The conveyor may, in turn, be configured to direct crop material discharged from the harvesting implement 14 to a location transversely displaced from the longitudinal centerline of the agricultural harvester 10 (e.g., by directing the crop material to one side of the agricultural harvester 10). In this manner, windrows of harvested crop material may be positioned for combination (i.e., merging) with the harvested crop material from a previous cutting pass made by the windrower.

Additionally, as shown in FIG. 1, the merger assembly 32 may also include an actuation device 36 coupled between the merger frame 34 and the tractor frame 16 for raising and lowering the frame 34 (and, thus, the conveyor) relative to the field surface. As such, the conveyor may be moved between a raised or non-working position, at which the severed crop material expelled from the harvesting implement 14 is directed underneath the conveyor and deposited onto the field surface along the longitudinal centerline of the agricultural harvester 10, and a lowered or working position, at which the severed crop material expelled from the harvesting implement 14 is intercepted by the conveyor and directed laterally outwardly via the conveyor to one side of the agricultural harvester 10. Thus, when the conveyor is moved to its non-working position, the severed crop material cut by the harvesting implement 14 is expelled rearwardly and is deposited onto the ground as a windrow along the longitudinal centerline of the agricultural harvester 10 within the lateral space defined between the wheels 18, 20 of the agricultural harvester 10. Conversely, when the conveyor is moved to its working position, the severed crop material cut by the harvesting implement 14 is expelled rearwardly onto the conveyor, thereby allowing the severed crop material to be conveyed laterally to one side of the agricultural harvester 10.

Figure 2:
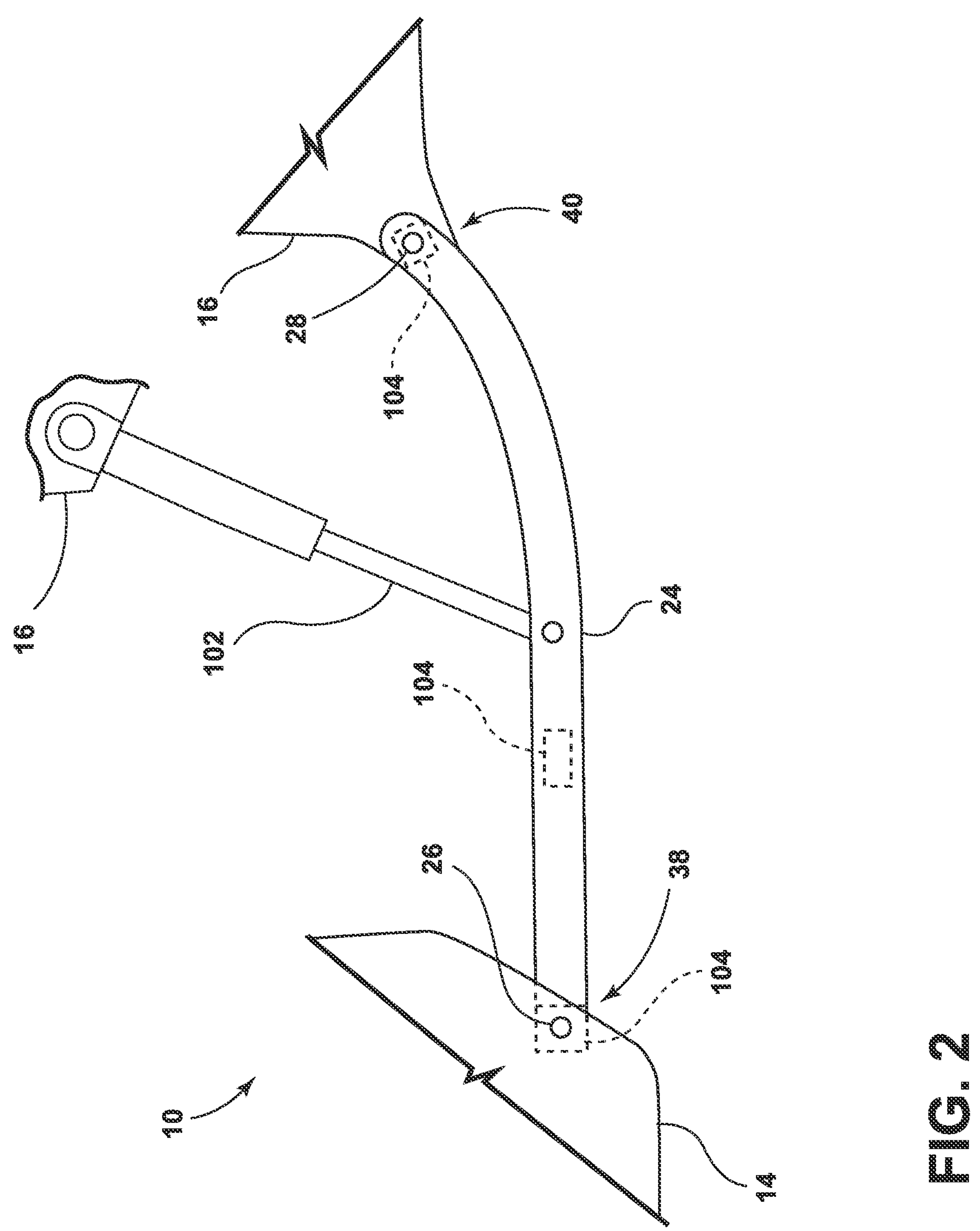
FIG. 2 illustrates an enlarged partial side view of the agricultural harvester shown in FIG. 1, particularly illustrating an arm of the agricultural harvester.

FIG. 2 illustrates an enlarged partial side view of the agricultural harvester 10 shown in FIG. 1, particularly illustrating one of the arm(s) 24 of the agricultural harvester 10. As mentioned above, the arm 24 is coupled to the harvesting implement 14 at the first pivot joint 26 and coupled to the frame 16 at the second pivot joint 28. As such, in several embodiment, a first end 38 of the arm 24 is coupled to the harvesting implement 14 via the first pivot joint 26. Conversely, an opposing, second end 40 of the arm 24 is coupled to the frame 16 of the tractor 12 via the second pivot joint 28. Thus, the pushing force P is transmitted from the tractor 12 through the arm(s) 24 to the harvesting implement 14 such that movement of the agricultural harvester 10 in the travel direction T slides the harvesting implement 14 along the field surface.

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of agricultural harvester configuration.

Moreover, the agricultural harvester 10 includes one or more sensors 104. In general, the sensor(s) 104 is configured to generate data indicative of the pushing force P acting on the harvesting implement 14. For example, in one embodiment, a sensor 104 may be in operative association with one or more of the arms 24. Thus, the data generated by such sensor(s) 104 may be directly indicative of the pushing force P as the pushing force P is transmitting through the arm(s) 24. Conversely, in another embodiment, a sensor 104 may be in operative association with each of the first pivot joints 26 and/or the second pivot joint 28. As such, the data generated by such sensor(s) 104 may be indicative of the torque acting on such pivot joint(s) 26, 28. Based on this torque data, the pushing force P as the pushing force P is acting on the harvesting implement 14 can be determined.

As shown in FIG. 2, a sensor 104 is provided in operative association with the arm 24, the first pivot joint 26, and the second pivot join 28. This is to illustrate possible locations for the sensor(s) 104. In practice, the agricultural harvester 10 may include the sensor(s) 104 at only one of the illustrated locations, such as only in operative association with the arms(s) 24, the first pivot joint(s) 26, or the second pivot joint(s) 28. However, in some embodiment, the agricultural harvester 10 may include the sensor(s) 104 at number and/or combination of the illustrated locations.

In addition, the sensor(s) 104 may correspond to any suitable type of sensor(s) or sensing device(s) configured to generate data indicative of the pushing force P acting on the harvesting implement 14. For example, in one embodiment, the sensor(s) 104 may correspond to a load cell(s). Alternatively, the sensor(s) 104 may correspond to a strain gauge(s).

Figure 3:
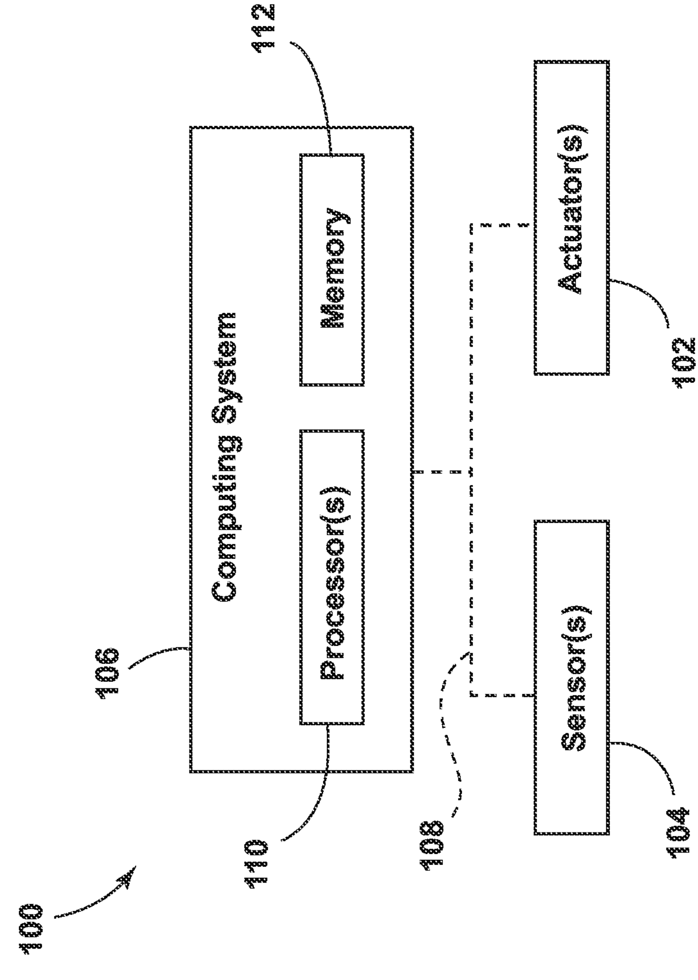
FIG. 3 illustrates a schematic view of one embodiment of a system for controlling harvesting implement floatation force on an agricultural harvester in accordance with aspects of the present subject matter.

Referring now to FIG. 3, a schematic view of one embodiment of a system 100 for controlling harvesting implement floatation force on an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 includes a computing system 106 communicatively coupled to one or more components of the agricultural harvester 10 and/or the system 100 to allow the operation of such components to be electronically or automatically controlled by the computing system 106. For instance, the computing system 106 may be communicatively coupled to the sensor(s) 104 via a communicative link 108. As such, the computing system 106 may be configured to receive data from the sensor(s) 104 that is indicative of the pushing force P acting on the harvesting implement 14. Furthermore, the computing system 106 may be communicatively coupled to the actuator(s) 102 via the communicative link 108. In this respect, the computing system 106 may be configured to adjust the flotation force F acting on the harvesting implement 14. In addition, the computing system 106 may be communicatively coupled to any other suitable components of the agricultural harvester 10 and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, and/or the like.

Figure 4:
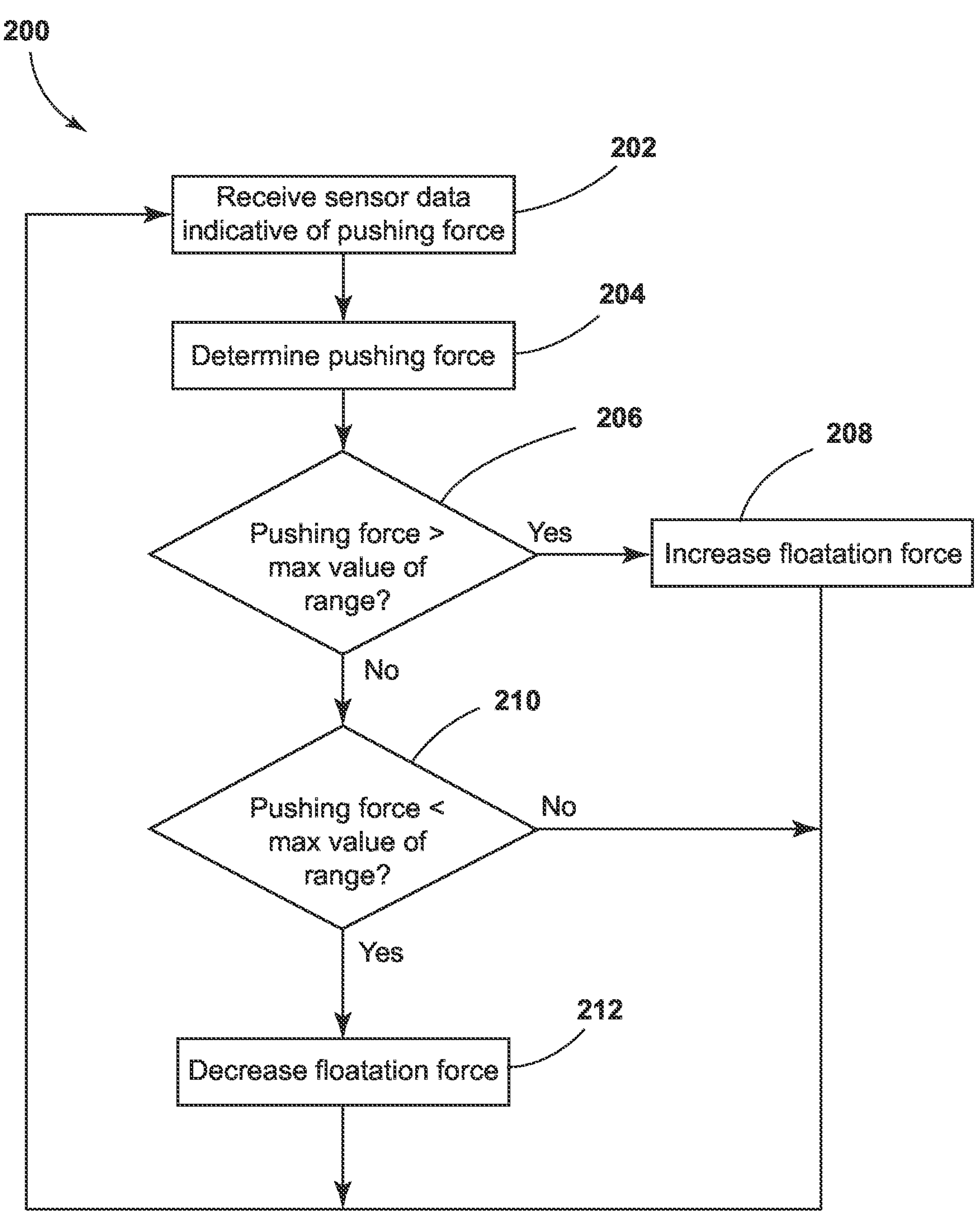
FIG. 4 illustrates a flow diagram providing one embodiment of control logic for controlling harvesting implement floatation force on an agricultural harvester in accordance with aspects of the present subject matter.

Referring now to FIG. 4, a flow diagram of one embodiment of an example control logic 200 that may be executed by the computing system 106 (or any other suitable computing system) for controlling harvesting implement floatation force on an agricultural harvester is illustrated in accordance with aspects of the present subject matter. Specifically, the control logic 200 shown in FIG. 4 is representative of steps of one embodiment of an algorithm that can be executed to control the floatation force acting on a harvesting implement of an agricultural harvester in a manner that improves harvesting quality as soil type and/or conditions vary throughout the field. Thus, in several embodiments, the control logic 200 may be advantageously utilized in association with a system installed on or forming part of an agricultural harvester to allow for real-time control of harvesting implement floatation force without requiring substantial computing resources and/or processing time. However, in other embodiments, the control logic 200 may be used in association with any other suitable system, application, and/or the like for controlling harvesting implement floatation force on an agricultural harvester.

As shown in FIG. 4, at (202), the control logic 200 includes receiving sensor data indicative of a pushing force acting on a harvesting implement of an agricultural harvester as the agricultural harvester travels across the field. Specifically, as mentioned above, in several embodiments, the computing system 106 may be communicatively coupled to the sensor(s) 104 via the communicative link 108. In this respect, as the agricultural harvester 10 travels across the field to perform a harvesting operation thereon, the computing system 106 may receive data from the sensor(s) 104. Such data may, in turn, be indicative of the pushing force P acting on the harvesting implement 14 as the harvesting implement 14 slides along the field surface during the harvesting operation.

Furthermore, at (204), the control logic 200 includes determining the pushing force acting on the harvesting implement based on the received sensor data. Specifically, in several embodiments, the computing system 106 is configured to analyze the sensor data received at (202) to determine the pushing force P acting on the harvesting implement 14. As will be described below, the computing system 106 is configured to control the operation of the actuator(s) 102 based on the determined pushing force P. For example, in some embodiments, the computing system 106 is configured to compare the pushing force P determined at (204) to a predetermined range. Thereafter, when the determined pushing force P falls outside of the predetermined range, the computing system 106 is configured to control the operation of the actuator(s) 102 to adjust the floatation force acting on the harvesting implement 14.

At (204), the pushing force P acting on the harvesting implement 14 may be determined in any suitable manner. For example, as mentioned above, in some embodiments, the sensor(s) 104 may be in operative association with the arm(s) 24 of the agricultural harvester 10. In such embodiments, the computing system 106 may determine the pushing force P directly from the sensor data received at (202). Conversely, in other embodiments, the sensor(s) 104 may be in operative association with the first and/or second pivot joints 26, 28 of the agricultural harvester 10. In such embodiments, the computing system 106 may determine the torque acting on the pivot joints 26, 28 from the sensor data received at (202). Thereafter, the computing system 106 may determine the pushing force P from the determined torque.

Additionally, at (206), the control logic 200 includes comparing the determined pushing force to a maximum value of a predetermined range. Specifically, in some embodiments, the computing system 106 is configured to compare the pushing force P determined at (204) to a maximum value of a predetermined range. When the determined pushing force P exceeds the maximum value, the pushing force P necessary to slide the harvesting implement 14 across the field surface is too great (e.g., due to changes in soil type or conditions), thereby resulting in poor quality of the harvesting operation. For example, when the agricultural harvester 10 enters a portion of the field that is drier or sandier than the portion of the field the agricultural harvester 10 was previously in, the pushing force P may increase. Furthermore, the pushing force P may increase due to accumulations of soil and/or crop material on the harvesting implement 14 during the harvesting operation, thereby increasing the total weight of the harvesting implement 14. In such instances, the control logic 200 proceeds to (208). Conversely, when the determined pushing force P is at or below the maximum value, the pushing force P necessary to slide the harvesting implement 14 across the field surface may be sufficiently low enough to result in a high-quality harvesting operation. In such instances, the control logic 200 proceeds to (210).

Moreover, at (208), the control logic 200 includes increasing the floatation force acting on the harvesting implement. Specifically, in some embodiments, the computing system 106 may be configured to control the operation of the actuator(s) 102 such that the floatation force F acting on the harvesting implement 14 is increased. Such an increase in the floatation force F decreases the portion of the weight of the harvesting implement 14 being supported by the field surface, thereby reducing the pushing force P needed to slide the harvesting implement 14 across the field surface. The increase in floatation force F initiated at (208) is intended to reduce the pushing force P such that the pushing force P is below the maximum value of the predetermined range (and above a minimum value of the predetermined range). When increasing the floatation force F, the harvesting implement 14 (e.g., specifically the skid shoe 30) is maintained in contact with the field surface. Upon completion of (208), the control logic 200 returns to (202).

Conversely, at (210), the control logic 200 includes comparing the determined pushing force to a minimum value of a predetermined range. Specifically, in some embodiments, the computing system 106 is configured to compare the pushing force P determined at (204) to a minimum value of a predetermined range. When the determined pushing force P falls below the minimum value, the pushing force P necessary to slide the harvesting implement 14 across the field surface is too low (e.g., due to changes in soil type or conditions), thereby resulting in poor quality of the harvesting operation. For example, when the agricultural harvester 10 enters a portion of the field that is wetter or has a higher clay content than the portion of the field the agricultural harvester 10 was previously in, the pushing force P may decrease. Furthermore, the pushing force P may decrease when soil that has accumulated on the harvesting implement 14 earlier in the harvesting operation dries, thereby decreasing the total weight of the harvesting implement 14. In such instances, the control logic 200 proceeds to (212). Conversely, when the determined pushing force P is at or above the minimum value, the pushing force P necessary to slide the harvesting implement 14 across the field surface may be sufficiently high enough to result in a high-quality harvesting operation. In such instances, the control logic 200 returns to (202).

In addition, at (212), the control logic 200 includes decreasing the floatation force acting on the harvesting implement. Specifically, in some embodiments, the computing system 106 may be configured to control the operation of the actuator(s) 102 such that the floatation force F acting on the harvesting implement 14 is decreased. Such a decrease in the floatation force F increases the portion of the weight of the harvesting implement 14 being supported by the field surface, thereby increasing the pushing force P needed to slide the harvesting implement 14 across the field surface. The decrease in floatation force F initiated at (212) is intended to increase the pushing force P such that the pushing force P is above the minimum value of the predetermined range (and below the maximum value of the predetermined range).

Figure 5:
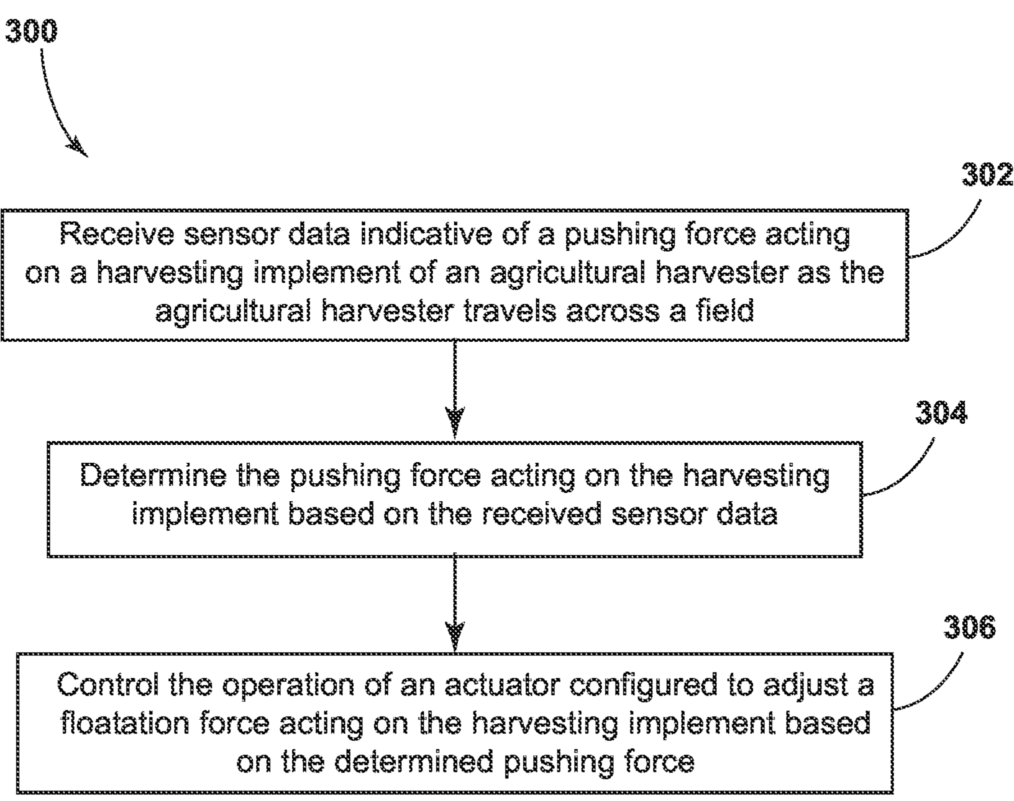
FIG. 5 illustrates a flow diagram of one embodiment of a method for controlling harvesting implement floatation force on an agricultural harvester in accordance with aspects of the present subject matter.

Referring now to FIG. 5, a flow diagram of one embodiment of a method 300 for controlling harvesting implement floatation force on an agricultural harvester is illustrated in accordance with aspects of the present subject matter. In general, the method 300 will be described herein with reference to the agricultural harvester 10 and the system 100 described above with reference to FIGS. 1-4. However, it should be appreciated by those of ordinary skill in the art that the disclosed method 300 may generally be implemented with any agricultural harvesters having any suitable harvester configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes receiving, with a computing system, sensor data indicative of a pushing force acting on a harvesting implement of an agricultural harvester as the agricultural harvester travels across the field. For instance, as described above, the computing system 106 is configured to receive data from the sensor(s) 104 via the communicative link 108. Such sensor data is, in turn, indicative of the pushing force P acting on the harvesting implement 14 as the agricultural harvester 10 travels across the field.

Additionally, at (304), the method 300 includes determining, with the computing system, the pushing force acting on the harvesting implement based on the received sensor data. For instance, as described above, the computing system 106 is configured to determine the pushing force P acting on the harvesting implement 14 based on the received sensor data.

Moreover, as shown in FIG. 5, at (306), the method 300 includes controlling, with the computing system, the operation of an actuator configured to adjust a flotation force acting on the harvesting implement based on the determined pushing force. For instance, as described above, the computing system 106 is configured to control the operation of the actuator(s) 102, which are configured to adjust the flotation force F acting on the harvesting implement 14, based on the determined pushing force.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system

106 described herein, including any steps of the control logic 200 and the method 300 described herein.

The term “software code” or “code” used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term “software code” or “code” also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:

a frame;

a harvesting implement adjustably coupled to the frame, the harvesting implement configured to harvest crop material present within a field across which the agricultural harvester is traveling;

an arm coupled to the harvesting implement at a first pivot joint and coupled to the frame at a second pivot joint;

an actuator coupled between the frame and the harvesting implement, the actuator configured to adjust a floatation force acting on the harvesting implement perpendicular to a travel direction of the agricultural harvester;

a sensor configured to generate data indicative of a pushing force acting on the harvesting implement parallel to the travel direction; and a computing system communicatively coupled to the sensor, wherein the computing system:

determines the pushing force acting on the harvesting implement parallel to the travel direction based on the data generated by the sensor; and controls an operation of the actuator to adjust the floatation force acting on the harvesting implement perpendicular to the travel direction based on the determined pushing force such that the harvesting implement is maintained in contact with a soil surface of the field.

2. The agricultural harvester of claim 1, wherein, when controlling the operation of the actuator, the computing system:

compares the determined pushing force to a predetermined range; and when the determined pushing force falls outside of the predetermined range, controls the operation of the actuator to adjust the floatation force acting on the harvesting implement.

3. The agricultural harvester of claim 1, wherein the sensor is in operative association with the arm.

4. The agricultural harvester of claim 1, wherein the sensor is in operative association with one of the first pivot joint or the second pivot joint.

5. A system for controlling harvesting implement floatation force on an agricultural harvester, the system comprising:

a harvesting implement configured to harvest crop material present within a field across which the agricultural harvester is traveling;

an actuator configured to adjust a floatation force acting on the harvesting implement perpendicular to a travel direction of the agricultural harvester;

a sensor configured to generate data indicative of a pushing force acting on the harvesting implement parallel to the travel direction; and a computing system communicatively coupled to the sensor, wherein the computing system:

determines the pushing force acting on the harvesting implement parallel to the travel direction based on the data generated by the sensor; and controls an operation of the actuator to adjust the floatation force acting on the harvesting implement perpendicular to the travel direction based on the determined pushing force such that the harvesting implement is maintained in contact with a soil surface of the field.

6. The system of claim 5, wherein, when controlling the operation of the actuator, the computing system:

compares the determined pushing force to a predetermined range; and when the determined pushing force falls outside of the predetermined range, controls the operation of the actuator to adjust the floatation force acting on the harvesting implement.

7. The system of claim 6, wherein, when controlling the operation of the actuator, the computing system controls the operation of the actuator such that the floatation force acting on the harvesting implement is decreased when the determined pushing force falls below a minimum value of the predetermined range.

8. The system of claim 6, wherein, when controlling the operation of the actuator, the computing system controls the operation of the actuator such that the floatation force acting on the harvesting implement is increased when the determined pushing force exceeds a maximum value of the predetermined range.

9. The system of claim 5, further comprising:

an arm coupled to the harvesting implement at a first pivot joint and configured to be coupled to a frame of the agricultural harvester at a second pivot joint, wherein the sensor is provided in operative association with the arm.

10. The system of claim 5, further comprising:

an arm coupled to the harvesting implement at a first pivot joint and configured to be coupled to a frame of the agricultural harvester at a second pivot joint, wherein the sensor is provided in operative association with the first pivot joint.

11. The system of claim 5, wherein the sensor comprises a load cell.

12. A method for controlling harvesting implement floatation force on an agricultural harvester, the agricultural harvester including a harvesting implement configured to harvest crop material present within a field across which the agricultural harvester is traveling, the method comprising:

receiving, with a computing system, sensor data indicative of a pushing force acting on the harvesting implement parallel to a travel direction of the agricultural harvester as the agricultural harvester travels across the field;

determining, with the computing system, the pushing force acting on the harvesting implement parallel to the travel direction based on the received sensor data; and controlling, with the computing system, an operation of an actuator configured to adjust a floatation force acting on the harvesting implement perpendicular to the travel direction based on the determined pushing force such that the harvesting implement is maintained in contact with a soil surface of the field.

13. The method of claim 12, wherein controlling the operation of the actuator comprises:

comparing, with the computing system, the determined pushing force to a predetermined range; and when the determined pushing force falls outside of the predetermined range, controlling, with the computing system, the operation of the actuator to adjust the floatation force acting on the harvesting implement.

14. The method of claim 13, wherein controlling the operation of the actuator comprises controlling, with the computing system, the operation of the actuator such that the floatation force acting on the harvesting implement is decreased when the determined pushing force falls below a minimum value of the predetermined range.

15. The method of claim 13, wherein controlling the operation of the actuator comprises controlling, with the computing system, the operation of the actuator such that the floatation force acting on the harvesting implement is increased when the determined pushing force exceeds a maximum value of the predetermined range.

16. The method of claim 12, wherein receiving the sensor data comprises receiving, with the computing system, the sensor data indicative of the pushing force acting on the harvesting implement from a sensor provided in operative association with an arm configured to be coupled between the harvesting implement and a frame of the agricultural harvester.

17. The method of claim 12, wherein receiving the sensor data comprises receiving, with the computing system, the sensor data indicative of the pushing force acting on the harvesting implement from a sensor provided in operative association with a pivot joint between the harvesting implement and an arm of the agricultural harvester.

* * * * *